(12) United States Patent
Condon et al.

(10) Patent No.: US 7,720,753 B1
(45) Date of Patent: May 18, 2010

(54) QUANTIFYING THE OUTPUT OF CREDIT RESEARCH SYSTEMS

(75) Inventors: Patrick James Condon, Cornelius, NC (US); Vinay D. Deshmukh, Cupertino, CA (US); Christopher Lee Parrish, Charlotte, NC (US); Winnie W. Cheng, Charlotte, NC (US); Erica L. Turner, Charlotte, NC (US); Randall T. Royther, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 163 days.

(21) Appl. No.: 11/950,375

(22) Filed: Dec. 4, 2007

(51) Int. Cl.
G06Q 40/00 (2006.01)
(52) U.S. Cl. .................................................. 705/38
(58) Field of Classification Search ................... 705/38
See application file for complete search history.

(56) References Cited

U.S. PATENT DOCUMENTS

| | | | | |
|---|---|---|---|---|
| 6,029,149 | A * | 2/2000 | Dykstra et al. | 705/38 |
| 6,119,103 | A * | 9/2000 | Basch et al. | 705/35 |
| 6,202,053 | B1 * | 3/2001 | Christiansen et al. | 705/38 |
| 6,513,018 | B1 * | 1/2003 | Culhane | 705/35 |
| 2003/0009418 | A1 * | 1/2003 | Green et al. | 705/38 |
| 2003/0061232 | A1 * | 3/2003 | Patterson | 707/104.1 |
| 2003/0117443 | A1 * | 6/2003 | Langner et al. | 345/810 |
| 2004/0044615 | A1 * | 3/2004 | Xue et al. | 705/38 |
| 2004/0107161 | A1 * | 6/2004 | Tanaka et al. | 705/38 |
| 2005/0119961 | A1 * | 6/2005 | Tanzillo et al. | 705/36 |
| 2006/0111993 | A1 * | 5/2006 | Lawrence et al. | 705/35 |
| 2006/0129481 | A1 * | 6/2006 | Bhatt et al. | 705/39 |
| 2006/0195375 | A1 * | 8/2006 | Bohn | 705/35 |

* cited by examiner

*Primary Examiner*—James Kramer
*Assistant Examiner*—Lindsay M. Maguire
(74) *Attorney, Agent, or Firm*—Banner & Witcoff, Ltd.

(57) ABSTRACT

A method of quantifying the value added by an internal company credit rating system is described. The method includes determining an internal company credit rating for each of a plurality of securities. The internal company credit rating for each of the plurality of securities and an external credit research agency original credit rating for each of the securities are inputted in a ratings history database. Data representative of a change of the external credit research agency original credit rating for at least one security of the plurality of securities to a new credit rating is received. Responsive to the change, data representative of a current price of the at least one security and a benchmark price of the at least one security is received. At least one metric is calculated to determine the number of times the internal company credit ratings for each of the plurality of securities was correct.

19 Claims, 4 Drawing Sheets

QUANTIFYING THE OUTPUT OF CREDIT RESEARCH SYSTEMS

BACKGROUND

For continued growth and development of financial assets, companies utilize credit research systems to determine the applicable securities to invest in for the company. Cash investment credit research processes addresses short term securities distinguishing versus longer term bonds, that are usually less than a year in maturity, fixed income instruments. Credit research systems evaluate credit ratings for securities that a company then utilizes for determining what to invest in, and how much to invest.

For any security to invest in, the pricing of the security and the yield of the security are highly dependent on the credit quality of the issuer of the security. As such, an issuer of a security with a lower credit quality rating, i.e., a higher risk, equates to the security having a higher return due to the higher risk involved. Companies utilize this information to invest more or less in different securities.

When at all possible, goals for investments on a security for a company include lowering risk and increasing return. With respect to the credit rating of an issuer of a security, 1 or 2 basis points may be a huge differentiator.

Currently there is no mechanism to assess objectively the performance of a credit rating system at the aggregate, sector, and/or analyst levels. A robust credit rating process is a prerequisite for providing high risk adjusted returns to investors and ensuring capital preservation. Currently there are no metrics in place to measure a rating effectiveness. No formal process exists to monitor the timing and sequence of internal ratings, agency ratings, and market reaction to those ratings.

Therefore, there exists a need in the art for a system and method that quantifies the value added by a cash investment credit research agency.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and system for a new cash investment credit research process that quantifies the value added by a cash investment credit research team. The new process facilitates marketing credit capabilities as a competitive differentiator, and associating the credit scores to evaluate the relative performance and compensation of credit research analysts. The new process ultimately results in better risk adjusted returns to investors, preservation of capital, and the capability to anticipate risks or opportunities ahead of external credit rating agencies.

In accordance with other aspects of the present invention, a method of quantifying the value added by an internal company credit rating system is described. The method includes determining an internal company credit rating for each of a plurality of securities. The internal company credit rating for each of the plurality of securities and an external credit research agency original credit rating for each of the securities are inputted in a ratings history database. Data representative of a change of the external credit research agency original credit rating for at least one security of the plurality of securities to a new credit rating is received. Responsive to the change, data representative of a current price of the at least one security and a benchmark price of the at least one security is received. At least one metric is calculated to determine the number of times the internal company credit ratings for each of the plurality of securities was correct.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
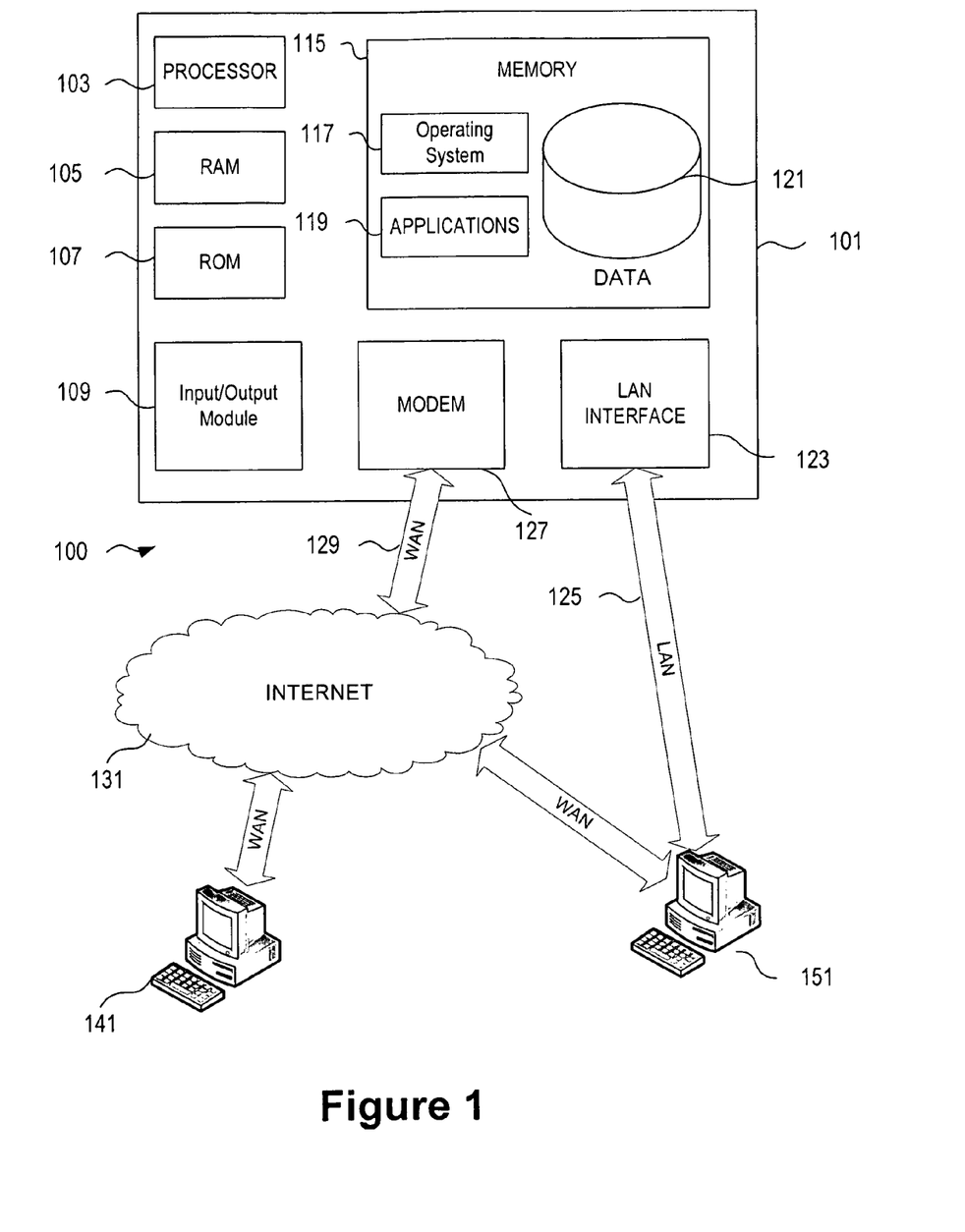
FIG. 1 illustrates a schematic diagram of a general-purpose digital computing environment in which certain aspects of the present invention may be implemented.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
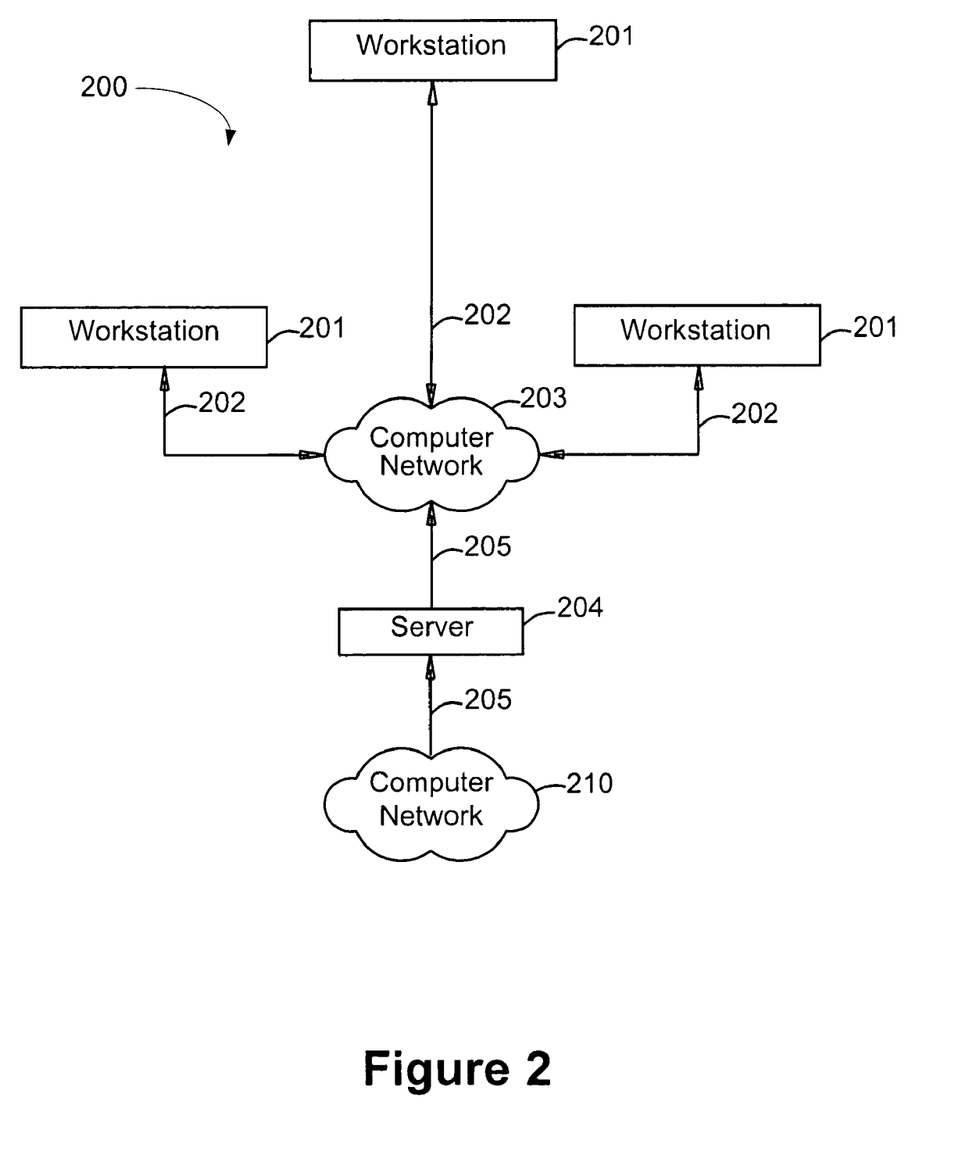
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

As understood by those skilled in the art, the steps that follow in the Figures may be implemented by one or more of the components in FIGS. 1 and 2 and/or other components, including other computing devices.

Aspects of the present invention provide a method and an apparatus as outlined below to compare at least two credit research systems. Aspects include metrics to quantify the performance of a cash investment credit research system. Such metrics may be designed to work well under wide ranging scenarios and business conditions.

Aspects include a robust process to collect the data needed to compute the above metrics. Data comprises of the rating changes of fixed income securities and their pricing indications. The process ensures timely and accurate acquisition of data. The process puts in place a control mechanism to detect errors.

Further aspects of the invention provide an algorithm needed to compute the metrics. Aspects also provide the mapping of cash investment credit research system to an external agency's credit research systems. Further aspects of the present invention suggest modifications to an existing system to persistently store rating and pricing data and retrieve it. In addition, further aspects of the present invention provide a scorecard to illustrate the performance of a cash investment credit research system.

The metrics and algorithms encapsulate more than a billion possible scenarios. The scenarios represent all possible combinations of the ratings, watch and/or outlook provided by external credit rating agencies, such as S&P, Moody's, and Fitch, and the internal ratings of a company. A combination, for example, may be:

S&P—Upgrade

Moody's—No change

Fitch—Downgrade

Internal Rating of Company—No change

The processes and systems put in place ensure that timely, accurate, and relevant information is disseminated to all stakeholders. Moreover the processes and systems have control mechanisms in place to prevent intentional/unintentional data errors, gaming of metrics, and to detect change in organizational behavior arising from the metrics.

One metric seeks to measure the number of times a rating was right. It is based on the following concept from probability theory. Any test can have four (4) possible outcomes:

True positive—An internal company rating value for a security is predicted correctly in an upgrade direction.

True negative—An internal company rating value for a security is predicted correctly in a downgrade direction.

False positive—An internal company rating value for a security is predicted incorrectly as the rating value moves up in grading when the internal rating of the company expected the rating value to move in a downgrade direction.

False negative—An internal company rating value for a security is predicted incorrectly as the rating value moves down when the internal rating of the company expected the rating value to move in an upgrade or no change direction.

Based upon this information, the effectiveness of a test may be gauged as follows.

> Effectiveness=The number of securities with spread movement in the right direction divided by the number of securities reviewed=(# of true positives+# of true negatives)/(# of true positives+# of true negatives+# of false positives+# of false negatives)

A business objective of the first metric may be to rate the performance of an analyst with respect to assessing the performance of the internal company credit rating on a security. For example, if an analyst upgrades a security and the spread reduces, the analyst was correct in upgrading the security rating. If the analyst upgrades a security and the spread increases, the analyst was incorrect in upgrading the security rating. If the analyst does not change the security rating and the spread increases or decreases with an agency rating change that diverged from the internal company rating, she was incorrect in not changing, e.g., upgrading or downgrading, the security rating.

The spread movement may be calculated as the difference between the spread as of the last rating change and the current spread. The spread is measured with respect to a benchmark. For calculation purposes, the security and benchmark prices as of a last change and as of now are needed. In addition, a security rating history for the period in question is needed.

A second metric seeks to measure the number of times the company predicted ahead of one or more of the outside credit research agencies. The percentage of times ahead is equal to the number of converged securities ahead of time divided by the total number of securities reviewed.

A business objective of the second metric may be to rate the performance of an analyst with respect to assessing the performance of the internal company credit rating on a security. For example, if the difference of opinion between the company's internal rating for a security and the rating by one or more credit research agencies reduced because the one or more credit research agencies followed the analyst's internal company credit rating or if the difference of opinion remained the same, an analyst may receive credit for a correct assessment of the credit rating on the security.

Illustrative examples follow. In a first example, assume the internal rating for a security was AAA previously. This time, the internal rating assessment by the analyst remains unchanged as AAA. If one or more of the credit research agencies upgraded their rating on the security from BBB to AAA, the analyst is ahead and may receive compensation/reward for an accurate assessment.

In a second example, assume the internal rating for a security was BBB previously. This time, the internal rating assessment by the analyst is to upgrade the security rating to A. If one or more of the credit research agencies previously rated the security as a B, and now downgrades the rating to C, the opinion differences previously noted do not converge and the analyst may not receive compensation/reward for an inaccurate assessment.

An analyst may receive compensation/reward if the difference of opinion between the rating of the internal company and one or more of the credit research agencies remains constant. An analyst may not receive compensation/reward if the analyst follows the credit research agencies. For calculation purposes, the security rating history for the internal company and one or more of credit research agencies for a period in question is required.

A third metric seeks to measure the number of times the company predicted behind of one or more of the outside credit research agencies. The percentage of times behind is equal to the number of converged securities behind the time divided by the total number of securities reviewed.

A business objective of the third metric may be to rate the performance of an analyst with respect to assessing the performance of the internal company credit rating on a security. For example, if the difference of opinion between the company's internal rating for a security and the rating by one or more credit research agencies increased because the one or more credit research agencies proceeded against the analyst's internal company credit rating, an analyst may receive credit for an incorrect assessment of the credit rating on the security.

An illustrative example follows. Assume the internal rating for a security was AAA previously. This time, the internal rating assessment by the analyst remains unchanged as AAA. If one or more of the credit research agencies downgraded their rating on the security from BBB to CCC, the analyst is behind and may receive no compensation/reward for an inaccurate assessment.

An analyst may not receive compensation/reward if the difference of opinion between the rating of the internal company and one or more of the credit research agencies remains constant. For calculation purposes, the security rating history for the internal company and one or more of credit research agencies for a period in question is required.

A fourth metric seeks to measure the impact of a company's internal credit ratings in terms of change in spread. The metric is based on interest rate spread of a security with respect to a benchmark security. Interest rate comprises $\alpha$ (default risk premium), $\beta$ (market risk premium), and $\gamma$ (income tax premium).

For calculation purposes, I1=Interest rate for the security being rated. $I1=\alpha 1+\beta 1+\gamma 1$. I2=Interest rate for the benchmark security. $I2=\alpha 2+\beta 2+\gamma 2$. If we choose the benchmark security such that $\alpha 2=0$, $\beta 2=\beta 1$, and $\gamma 2=\gamma 1$, the Spread=I1−I2=$\alpha 1$=the default risk premium of the security being rated. Thus by choosing an appropriate benchmark security, the default risk may be deduced by measuring the spread.

A business objective of the fourth metric may be to rate the performance of an analyst with respect to assessing the performance of the internal company credit rating on a security. For example, assume the spread of a security with respect to a benchmark was 25 bps. Now assume the security is upgraded, and the new spread is 20 bps. The net impact due to the upgrade is 5 bps. For calculation purposes, the security price history is required.

In accordance with one or more aspects of the present invention, graphs may be generated from calculated data to reflect rating trends. These may be graphs depicting one or more credit research agency ratings with respect to time, company internal ratings with respect to time, and differences of opinions between the one or more credit research agencies ratings and the company internal ratings with respect to time.

A fifth metric seeks to give the number of times a company's internal ratings were different from those of one or more credit research agencies. The percentage of times different is equal to the number of securities for which different ratings exist divided by the total number of securities reviewed. This is the number of opinion differences between a company and one or more credit research agencies expressed as a percentage of the total securities reviewed.

Similar to the other metrics, a business objective of the fifth metric may be to rate the performance of an analyst with respect to assessing the performance of the internal company credit rating on a security. For example, assume that a company's internal rating on a security was BBB while the rating by a credit research agency was also BBB. In such an example, the security rating was the same, i.e., no difference of opinion. If the company's internal rating was BBB and the credit research agency's rating was AAA, the ratings were different. Similarly, if the company's internal rating was BBB and the credit research agency's rating was AA, the ratings were different. For calculation purposes, the rating history on a security by the company and the one or more credit research agencies for a period in question is required.

Figure 3:
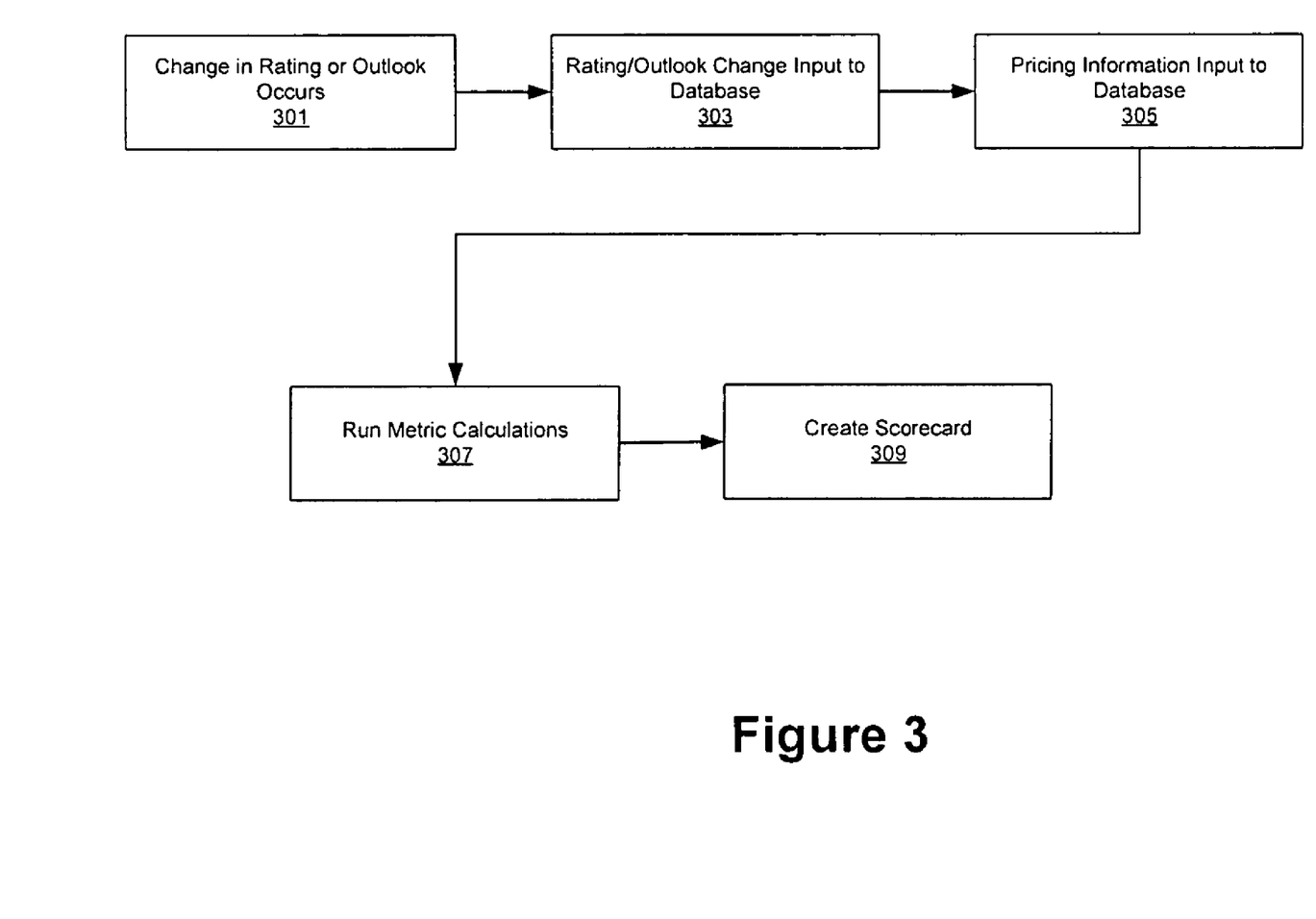
FIG. 3 is an example flow chart of an illustrative method for quantifying the value added by a cash investment credit research team in accordance with at least one aspect of the present invention.

FIG. 3 illustrates a high level overview of a process in accordance with at least one aspect of the present invention. When one or more of the credit research agencies and/or the internal company issues a rating change in step 301, it may be communicated to a mailing list and an analyst then may record the rating change in a database in step 303. The analyst then may send a pricing sheet to a trader to request pricing of a security and its benchmark starting two days before the rating change occurred. The trader continues to price the security and its benchmark for ten days or until the security matures, whichever comes earlier. Any of a number of algorithms for pricing securities may be utilized. The algorithm also may include a pricing mechanism for rejected securities. The analyst may store the net impact value in a database against the security in question in step 305. Finally, the analyst imports the data into a scorecard spreadsheet, runs the calculations in step 307, and creates the scorecard in step 309. Appropriate portions of the scorecard may be distributed to various stakeholders and others.

Figure 4:
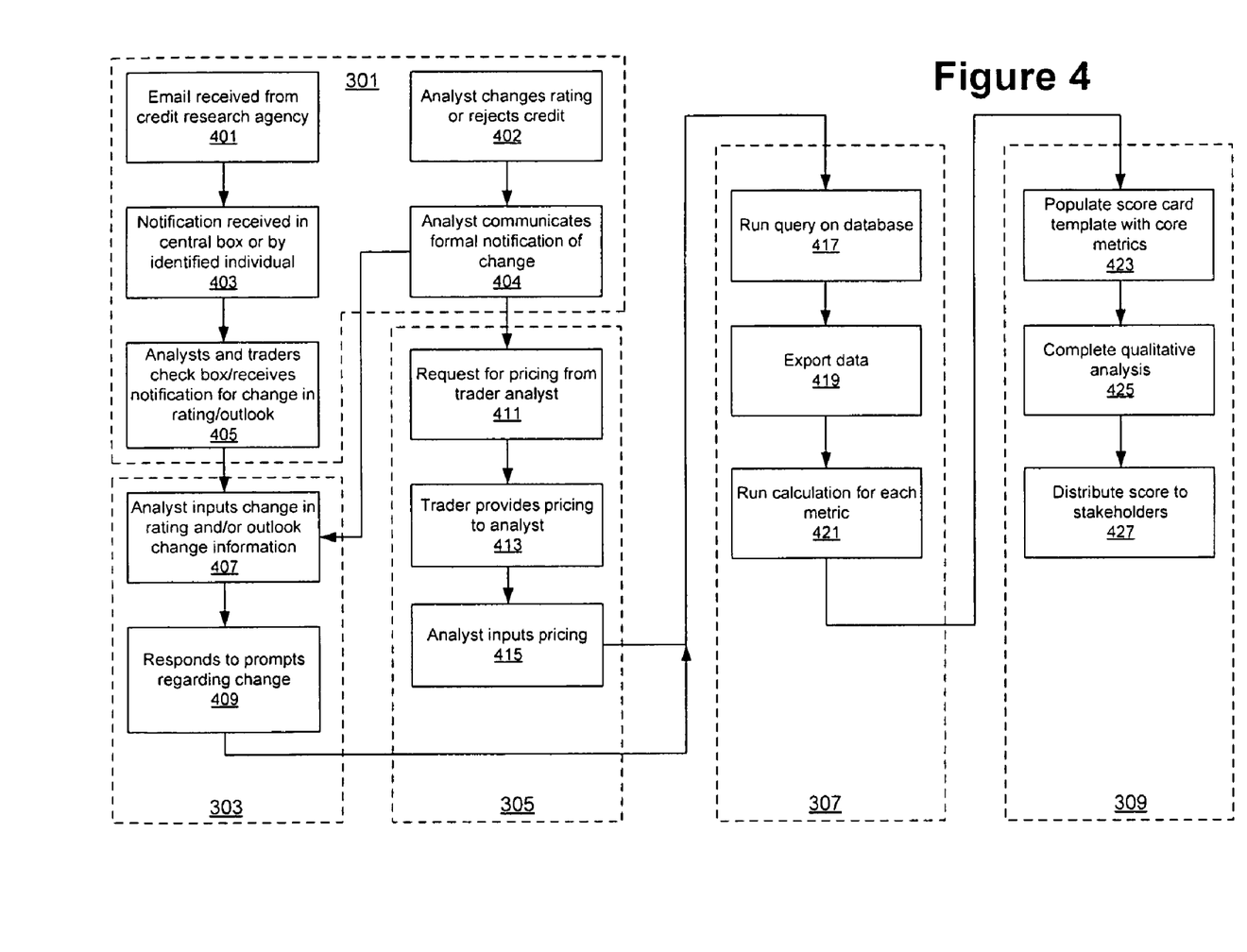
FIG. 4 is another example flow chart of an illustrative method for quantifying the value added by a cash investment credit research team in accordance with at least one aspect of the present invention.

FIG. 4 is another example flow chart of an illustrative method for quantifying the value added by a cash investment credit research team in accordance with at least one aspect of the present invention. FIG. 4 illustrates sub steps that may be performed at various portions of the steps of FIG. 3. As should be understood by one of ordinary skill, in the illustrative example of FIG. 4, the steps of FIG. 3, steps 301-309, are illustrated by broken line boxes surrounding various steps within FIG. 4.

With respect to FIG. 4, steps 401, 402, 403, 404, and 405 correlate to step 301, a change in rating or outlook occurs, from FIG. 3. Steps 401, 403, and 405 correlate to an example of a ratings change occurring to a security when done by an external credit research agency. Steps 402 and 404 correlate to an example of a ratings change occurring to a security when done internally as part of an internal evaluation by a company in accordance with one or more aspects of the present invention.

In the example of steps 401, 403, and 405, for a ratings change by an external credit research agency, a master account may be used at each credit research agency to track issuers and/or Committee on Uniform Security Identification Procedures (CUSIPs) products. The master account on each credit research agency website may be set up to send an email to an account associated with a company in the event of a ratings change by that credit research agency. Each analyst of the company may be responsible for ensuring each credit research agency website has all of the issuers/CUSIPS that need to be tracked. An analyst may provide a list of names to track and another analyst may update the websites on a periodic basis, such as quarterly. Each analyst may be responsible for checking an inbox of the account that the credit research agency emails to on a daily basis to check for ratings changes. In this example, in step 401, an email is received form a credit research agency. At step 403, a notification, such as an email, is received in a central email inbox of by an identified email recipient. Then, at step 405, analysts and/or traders check the boxes or receives some notification for the change by the credit research agency to a rating/outlook on a security.

In the example of steps 402 and 404, for a ratings change internally conducted by the company, an analyst may determine to change a rating of a security or reject the security all together in step 402. In step 404, the analyst then may send out a credit memorandum, such as an email and/or a report, noting the change in the rating of the particular security and/or the date of the change of the rating. As should be understood by those skilled in the art, other data may also be included in such a memorandum and that the rating change and date information is but illustrative examples.

With respect to FIG. 4, steps 407 and 409 correlate to step 303, a rating/outlook change being input into a database, from FIG. 3. With respect to steps 407 and 409, a database may be utilized. Such a database may be a Microsoft Access application by Microsoft Corporation of Redmond, Wash. The database is configured to maintain multiple ratings changes by each external credit research agency and the internal ratings by a company, marks related to certain CUSIPs, and the tracking of both taxable and municipal approved names within the same data table.

In accordance with at least one aspect of the present invention, a ratings history table is maintained in the database. Each time a rating is changed (such as outlook, short-term, long-term, company internal), a new record may be created within the ratings history table. As in step 407, this information may be inputted by the analyst. The ratings history table also may take a snapshot of the unchanged ratings at the time of the change to use in the calculation of the various metrics described above. In one example, those values may be viewed by a user double-clicking on the change record. The analyst also may see that the drop down options within the ratings categories may be limited, such as in step 409. The analyst may be restricted from filling in a value in an entry field other than those included in the drop down box for consistency purposes. Further, the outlook default may be "NR", the short-term and long-term default may be "NR" and the company's internal rating default may be "0". The analyst may need to ensure that all the current ratings and outlooks and changes entered into the ratings history table are accurate. A pop-up box may be incorporated into the approved list screen to remind the analyst to verify ratings if any are changed. A change from "NR" may be captured in the ratings history as a time stamp of an initial rating, but it may not show an indication of "Upgrade" or "Downgrade." All other changes may show whether the ratings changes were up or down.

With respect to FIG. 4, steps 411, 413, and 415 correlate to step 305, pricing information being input into a database, from FIG. 3. With respect to steps 411, 413, and 415, the database may be the same database as noted above with respect to steps 407 and 409. With respect to step 411, upon occurrence of a ratings change, an analyst responsible for the affected security(ies) may notify someone by sending a pricing sheet via email or other communication. The email communication and pricing sheet may note the issuer or CUSIP on the appropriate sheet for the pricing that is requested. A trader may be notified to obtain pricing information.

With respect to step 413, the trader may provide pricing to the analyst of the securities in the portfolio in addition to securities that have been rejected. The trader may select the securities and benchmark to price in accordance with guidelines noted on the pricing sheet. The trader may price indications on selected issuers or CUSIPs from one or more dealers that the trader reasonably believes to actively trade in such paper. In one example, the best indication may be recorded for that day. In cases of illiquidity or difficulty in obtaining bids, a best efforts approach must be used. A trade may be responsible for obtaining the price of the security(ies) and benchmark at a designated period before the ratings change, such as two days before the ratings change. This information provides the "base case" pricing for the security and benchmark. The trader may populate the pricing sheet provided by the analyst, which may includes daily pricing and a graphical presentation of prices. The trader may record the indication daily and this may be used in the net impact metric calculation noted above. The trader also may be responsible for obtaining the price of the security(ies) and benchmark in the manner described above each day for 2 days prior to the change and then a predefined period after the ratings change, such as 10 business days after the ratings change. Daily pricing may continue until the earliest of the following: the security(ies) mature(s) or 10 days or another time period as agreed to by all interested parties.

With respect to securities that are rejected, the day the security is rejected, a bid side price may be recorded. Thereafter, a price may be sought on all rejected securities at a designated time, such as semi-annually. Use the same benchmark and issuer characteristics as listed above may be utilized.

The trader, the analyst, and/or one or more other individuals may be required to enter additional data into the pricing sheet. For example, with respect to asset backed commercial paper (ABCP), the issuer's 90 day cp may be used as the indication of where the issuers' paper is trading. The responsible individual may get bid side discount indications of the issuers' paper in 90 days from at least two brokers and record the best bid in an ABCP sheet for that day. The provider of an ABCP benchmark may be the Federal Reserve. This data is offer side discount indications at a discount. This may posted every day on the website of the Federal Reserve.

With respect to corporate securities, the 1 year maturity may be used as an indication of where the corporate issuer is trading. The responsible individual may get at least two bid side indications on a 1 year bond and record the spread to 1 year LIBOR index in an issuer spread column. In addition, credit default swaps off may be used as a proxy of where the issuer is trading. The benchmark may be determined by industry, rating, and tenor. This data may be provided as a bid side spread to LIBOR index and may be collected as a spread in the pricing spreadsheet.

With respect to asset backed securities (ABS), the pricing on an ABS security may be specific to a CUSIP. The responsible individual may get at least two bid side indications and record the best bid in terms of spread to LIBOR index. Benchmark offer side spread may be obtained from an outside company, such as JP Morgan Query. This data may be provided as a spread to LIBOR index and may be recorded as a spread in the pricing sheet.

With respect to municipal bonds, the 1 year maturity may be used as a proxy of where the issuers' paper trades. The responsible individual may get two bid side indications and record the best bid. If a 1 year bond does not exist, the level may be interpolated by using a % of EDSF. A template to interpolate a 1 year level may be included within the pricing sheet. Benchmark data may be obtained from an outside company, such as the Bloomberg General Obligation AA+ index, for municipal issuers. This may chosen instead of a benchmark of a specific rating and industry since all other indexes may be too granular and may not capture enough spread to the issuer. This indication is a mid level that is the average of bid/side.

With respect to step 415, the data is inputted by the analyst into the database. The trader or other individual provides the analyst with pricing information and net impact value data as described above and the analyst puts the net impact value and other data into the database.

With respect to FIG. 4, steps 417, 419, and 421 correlate to step 307, run metric calculations, from FIG. 3. Data used to calculate the metrics may be sourced from the database. In one example, a download of data, via a query in step 417, from the database may be used to capture relevant pieces of raw data for metric calculations. The data may be exported in step 419 and calculations for each metric may be run in step 421.

With respect to the first metric, ratings effectiveness, the calculation outputs may show percentages of securities with spread movement in the right direction subsequent to a ratings change. The calculation of the ratings effectiveness may be as follows. A count of securities with a ratings change during a measurement period is determined. The count may be split between securities with a ratings change internally by the company and those with a ratings change by one or more external credit research agencies. Of those securities, a count of securities with |spread movement|>0 may be determined.

If |spread movement|>0, a count of securities that have gone in the right direction following a ratings change internally by the company may be determined. If the internal company rating is an upgrade, right direction means a negative spread movement. If the internal company rating is a downgrade, right direction means a positive spread movement. If |spread movement|>0, a count of securities in which there was not an internal company ratings change but a rating change by an external credit research agency may be determined. If a count of securities in which there was not an internal company ratings change but a rating change by an external credit research agency exists, a count of securities with spread movement that was in the wrong direction from the external credit research agency ratings change perspective may be determined. As such, this is the number of times the company was in the right direction.

Then, the count of securities that have gone in the right direction following a ratings change internally by the company is added to the count of securities with spread movement that was in the wrong direction from the external credit research agency ratings change perspective. This total count then is divided by the sum the count of securities with a ratings change internally by the company and the count of securities in which there was not an internal company ratings change but a rating change by an external credit research agency. This percentage is the rating effectiveness. This percentage is interpreted as the percentage of securities that have experienced spread movement in the right direction following an internal company's ratings change or spread movement in the right direction (i.e., wrong direction from the perspective of the external credit research agencies) following a ratings change by one or more of the external credit research agency. In addition, a percentage of securities with spread movement in the wrong direction or flat direction alternatively may be calculated in accordance with aspects of the present invention.

With respect to the second metric, percentage ahead or behind, the calculation outputs may show a percentage of time the company is ahead of or behind one or more external credit research agencies. The percentage may be measured based on convergence or divergence of ratings following a credit research agency or internal company ratings change.

Percentage of times ahead equate to a count of converged securities divided by a count of securities with ratings changes. Percentage of times behind equates to a count of diverged securities divided by a count of securities with ratings changes. Percentage of times with no change equates to a count of securities with no ratings changes divided by a count of securities reviewed. Percentage of times with change equates to a count of securities with a ratings change divided by a count of securities reviewed. The percentage of times ahead and percentage of times behind sum to 1. In addition, the percentage of times with no change and percentage of times with change sum to 1.

The metric looks at the absolute value of differences between ratings before and after a ratings change. Each ratings change is a separate event. For example, if three external credit research agencies downgrade both the long and short term rating for a security, the metric addresses six total observations, one for each external credit research agency for each of the lone term rating change and the short term rating change. The internal company ratings are compared to each event. Aggregation of the rating change of multiple credit research agencies may be an additional metric if desired.

If |internal company rating−rating of credit research agency|>|internal company rating−prior credit research agency rating|, (i.e., the ratings have diverged), the internal company is behind the credit research agency for that security. For example, if an internal company rating for a security is 3, a credit research agency rating is 4, and a prior rating by the credit research agency was 3, the result is 1>0, i.e., a divergence. Therefore, the internal company is behind the credit research agency for that security.

If |internal company rating−rating of credit research agency|<|internal company rating−prior credit research agency rating|, (i.e., the ratings have converged), the internal company is ahead of the credit research agency for that security. For example, if an internal company rating for a security is 3, a credit research agency rating is 3, and a prior rating by the credit research agency was 4, the result is 1<0, i.e., a convergence. Therefore, the internal company is ahead of the credit research agency for that security.

If |internal company rating−rating of credit research agency|<|prior internal company rating−rating of credit research agency|, (i.e., the ratings have converged), the internal company is ahead of the credit research agency for that security. For example, if an internal company rating for a security is 3, a credit research agency rating is 3, and a prior rating by the internal company was 4, the result is 0<1, i.e., a convergence. Therefore, the internal company is ahead of the credit research agency for that security.

To measure changes, ratings may be converted to numeric values as follows:

Rating=Ratings Mapping
  Plus 0.25 if negative outlook
  Plus 0.35 if watch negative
  Plus 0.00 if stable, developing, watch developing
  Minus 0.25 if positive outlook
  Minus 0.35 if watch positive A snapshot of ratings for each credit research agency at the point of any ratings change may be taken since there could be multiple ratings changes during a measurement period. For example, if there were two internal company ratings changes and two different credit research agencies changes during the same measurement period, the before and after rating to the credit research agency ratings at the point of change would need to be compared. If always compared to the current rating, the calculation may be comparing to the wrong rating.

The data table capturing the ratings changes may take a snapshot of the other ratings at the time so that they can be compared.

The third metric of the net impact may be calculated as described above. The fourth metric of graphical depictions then may be run. Illustrative examples include internal company ratings with respect to time, credit research agency ratings with respect to time, and difference in opinion between the two with respect to time. A graphical presentation of ratings by issuer and by credit research agency may also be shown. A function may be included in the database to show a pivot chart. Drop down lists may be included to allow a user to pick an issuer and credit research agency in the pivot chart. Date may be on the x axis of the graphical representations so that a history of ratings may be shown over time. For difference of opinion data, a graphical presentation of the magnitude of the difference in ratings by a credit research agency may be shown.

The fifth metric of percentage of times different may be run. This percentage may be a count of securities for which different ratings exist divided by the total number of securities rated by the internal company. If the absolute value of the difference between the internal company rating, as calculated in percentage of times ahead and percentage of times behind, is greater than zero, then there is a difference.

With respect to FIG. 4, steps 423, 425, and 427 correlate to step 309, create scorecard, from FIG. 3. In step 423, a scorecard may be populated with core metrics data. An illustrative scorecard follows:

| | |
|---|---|
| Period: | 2Q08 |
| Analyst: | John Smith |
| No. of Ratings Changes: | 18 |
| No. of Internal Company Ratings Changes: | 13 |
| First Agency's Ratings Changes: | 11 |
| Second Agency's Ratings Changes: | 7 |
| Third Agency's Ratings Changes: | 6 |
| Right Direction: | 9 |
| Wrong Direction: | 3 |
| Flat Direction: | 0 |
| Ratings Effectiveness: | 82% |
| % Ahead: | 50% |
| % Behind: | 50% |
| Net Impact: | 0.3 bps |
| % Times Different: | 63% |

In step 425, qualitative analysis may be completed. For example, notations may be made that during the period, the first credit research agency raised and lowered several bank ratings as a result of two changes in their rating methodology. These actions led to multiple ratings changes by the first credit research agency. Then, in step 427, the scorecard may be distributed to stakeholders.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. One or more computer readable media storing computer executable instructions that, when executed by at least one processor, cause the at least one processor to perform a method comprising:

determining an internal company credit rating for each of a plurality of securities;

inputting the internal company credit rating for each of the plurality of securities and an external credit research agency original credit rating for each of the securities in a ratings history database;

receiving data representative of a change of the external credit research agency original credit rating for at least one security of the plurality of securities to a new credit rating;

responsive to the change, receiving data representative of a current price of the at least one security and a benchmark price of the at least one security, the benchmark price being a price of the at least one security at a designated period before the change; and calculating at least one metric to determine the number of times the internal company credit ratings for each of the plurality of securities and a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security, wherein calculating at least one metric includes:

determining a count of the plurality of securities with a ratings change during a measurement period;

determining a count for spread movements of the count of the plurality of securities with a ratings change during the measurement period in a right direction; and determining a rating effectiveness as the count for spread movements in the right direction divided by the count of plurality of securities with a ratings change during the measurement period.

2. The one or more computer readable media of claim 1, further comprising maintaining the external credit research agency new credit rating for the at least one security in the ratings history database.

3. The one or more computer readable media of claim 1, further comprising maintaining the current price and the benchmark price of the at least one security in the ratings history database.

4. The one or more computer readable media of claim 1, further comprising reporting the number of times the internal company credit ratings for each of the plurality of securities had a true positive or true negative outcome.

5. The one or more computer readable media of claim 1, further comprising receiving data representative of a change to the internal company credit rating for the at least one security.

6. The one or more computer readable media of claim 1, wherein the calculating the at least one metric includes:

determining a count of the plurality of securities with a ratings change during a measurement period;

for each security of the count, determining a first absolute value difference between the internal company credit rating for the security and the external credit research agency new credit rating;

for each security of the count, determining a second absolute value difference between the internal company credit rating for the security and the external credit research agency original credit rating; and comparing the first absolute value difference and the second absolute value difference.

7. One or more computer readable media storing computer executable instructions that, when executed by at least one processor, cause the at least one processor to perform a method comprising:

receiving an internal company credit rating for each of a plurality of securities;

receiving an external credit research agency original credit rating for each of the securities in a ratings history database;

receiving data representative of a change of the external credit research agency original credit rating for at least one security of the plurality of securities to a new credit rating;

responsive to the change, receiving data representative of a current price of the at least one security and a benchmark price of the at least one security, the benchmark price being a price of the at least one security at a designated period before the change; and calculating at least one metric to determine the number of times the internal company credit ratings for each of the plurality of securities had a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security, wherein calculating at least one metric includes:

determining a count of the plurality of securities with a ratings change during a measurement period;

determining a count for spread movements of the count oldie plurality of securities with a ratings change during the measurement Period in a right direction; and determining a rating effectiveness as the count for spread movements in the right direction divided by the count of plurality of securities with a ratings change during the measurement period.

8. The one or more computer readable media of claim 7, the method further comprising maintaining the external credit research agency new credit rating for the at least one security in the ratings history database.

9. The one or more computer readable media of claim 7, the method further comprising maintaining the current price and the benchmark price of the at least one security in the ratings history database.

10. The one or more computer readable media of claim 7, the method further comprising reporting the number of times the internal company credit ratings for each of the plurality of securities had a true positive or true negative outcome.

11. The one or more computer readable media of claim 7, the method further comprising receiving data representative of a change to the internal company credit rating for the at least one security.

12. The one or more computer readable media of claim 7, wherein the calculating the at least one metric includes:

determining a count of the plurality of securities with a ratings change during a measurement period;

for each security of the count, determining a first absolute value difference between the internal company credit rating for the security and the external credit research agency new credit rating;

for each security of the count, determining a second absolute value difference between the internal company credit rating for the security and the external credit research agency original credit rating; and comparing the first absolute value difference and the second absolute value difference.

13. A system comprising:

at least one database configured to maintain an internal company credit rating for each of the plurality of securities and an external credit research agency original credit rating for each of the securities; and at least one computing device, operatively connected to the at least one database, configured to:
receive data representative of a change of the external credit research agency original credit rating for at least one security of the plurality of securities to a new credit rating;
responsive to the change, receive data representative of a current price of the at least one security and a benchmark price of the at least one security, the benchmark price being a price of the at least one security at a designated period before the change; and
calculate at least one metric to determine the number of times the internal company credit ratings for each of the plurality of securities had a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security, wherein the at least one computing device is further configured to:

determine a count of the plurality of securities with a ratings change during a measurement period;

determine a count for spread movements of the count of the plurality of securities with a ratings chance during the measurement period in a right direction; and determine a rating effectiveness as the count for spread movements in the right direction divided by the count of plurality of securities with a ratings change during the measurement period.

14. The system of claim 13, the at least one computing device further configured to report the number of times the internal company credit ratings for each of the plurality of securities had a true positive or true negative outcome.

15. The system of claim 13, the at least one computing device further configured to receive data representative of a change to the internal company credit rating for the at least one security.

16. The system of claim 13, the at least one computing device is further configured to:
determine a count of the plurality of securities with a ratings change during a measurement period;
for each security of the count, determine a first absolute value difference between the internal company credit rating for the security and the external credit research agency new credit rating;
for each security of the count, determine a second absolute value difference between the internal company credit rating for the security and the external credit research agency original credit rating; and
compare the first absolute value difference and the second absolute value difference.

17. One or more computer readable media storing computer executable instructions that, when executed by at least one processor, cause the at least one processor to perform a method comprising:
determining an internal company credit rating for each of a plurality of securities;
inputting the internal company credit rating for each of the plurality of securities and an external credit research agency original credit rating for each of the securities in a ratings history database;
receiving data representative of a change of the external credit research agency original credit rating for at least one security of the plurality of securities to a new credit rating;
responsive to the change, receiving data representative of a current price of the at least one security and a benchmark price of the at least one security, the benchmark price being a price of the at least one security at a designated period before the change; and
calculating at least one metric to determine the number of times the internal company credit ratings for each of the plurality of securities had a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security,
wherein the calculating the at least one metric includes:
determining a count of the plurality of securities with a ratings change during a measurement period;
for each security of the count, determining a first absolute value difference between the internal company credit rating for the security and the external credit research agency new credit rating;
for each security of the count, determining a second absolute value difference between the internal company credit rating for the security and the external credit research agency original credit rating; and
comparing the first absolute value difference and the second absolute value difference.

18. One or more computer readable media storing computer executable instructions that, when executed by at least one processor, cause the at least one processor to perform a method comprising:
receiving an internal company credit rating for each of a plurality of securities;
receiving an external credit research agency original credit rating for each of the securities in a ratings history database;
receiving data representative of a change of the external credit research agency original credit rating for at least one security of the plurality of securities to a new credit rating;
responsive to the change, receiving data representative of a current price of the at least one security and a benchmark price of the at least one security, the benchmark price being a price of the at least one security at a designated period before the change; and
calculating at least one metric to determine the number of times the internal company credit ratings for each of the plurality of securities had a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security, wherein the calculating the at least one metric includes:

determining a count of the plurality of securities with a ratings change during a measurement period;

for each security of the count, determining a first absolute value difference between the internal company credit rating for the security and the external credit research agency new credit rating;

for each security of the count, determining a second absolute value difference between the internal company credit rating for the security and the external credit research agency original credit rating; and comparing the first absolute value difference and the second absolute value difference.

19. A system comprising:

at least one database configured to maintain an internal company credit rating for each of the plurality of securities and an external credit research agency original credit rating for each of the securities; and at least one computing device, operatively connected to the at least one database, configured to:

receive data representative of a change of the external credit research agency original credit rating for at least one security of the plurality of securities to a new credit rating;

responsive to the change, receive data representative of a current price of the at least one security and a benchmark price of the at least one security, the benchmark price being a price of the at least one security at a designated period before the change; and calculate at least one metric to determine the number of times the internal company credit ratings for each of the plurality of securities had a true positive or true negative outcome, the calculating based upon the internal company credit rating for the at least one security, the external credit research agency original credit rating for the at least one security, the external credit research agency new credit rating for the at least one security, the current price of the at least one security, and the benchmark price of the at least one security, wherein the at least one computing device is further configured to:

determine a count of the plurality of securities with a ratings change during a measurement period;

for each security of the count, determine a first absolute value difference between the internal company credit rating for the security and the external credit research agency new credit rating;

for each security of the count, determine a second absolute value difference between the internal company credit rating for the security and the external credit research agency original credit rating; and compare the first absolute value difference and the second absolute value difference.

\* \* \* \* \*

UNITED STATES PATENT AND TRADEMARK OFFICE
CERTIFICATE OF CORRECTION

PATENT NO.         : 7,720,753 B1
APPLICATION NO.    : 11/950375
DATED              : May 18, 2010
INVENTOR(S)        : Patrick James Condon et al.

Page 1 of 1

It is certified that error appears in the above-identified patent and that said Letters Patent is hereby corrected as shown below:

Column 13, Claim 1, Line 23:
Please delete "securities and a true" and insert --securities had a true--

Column 14, Claim 7, Line 37:
Please delete "oldie plurality" and insert --of the plurality--

Signed and Sealed this
Eleventh Day of January, 2011

David J. Kappos
*Director of the United States Patent and Trademark Office*